3,233,513
WIDE-ANGLE EYEPIECE WITH LONG EYE RELIEF
Helmut Wagner, Wetzlar (Lahn), and Adolf Sterlepper, Steidorf, near Wetzlar (Lahn), Germany, assignors to Carl Zeiss-Stiftung, doing business as Carl Zeiss, Wurttemberg, Germany, a corporation of Germany
Filed Aug. 3, 1962, Ser. No. 214,708
Claims priority, application Germany, Aug. 5, 1961, H 43,333
1 Claim. (Cl. 88—57)

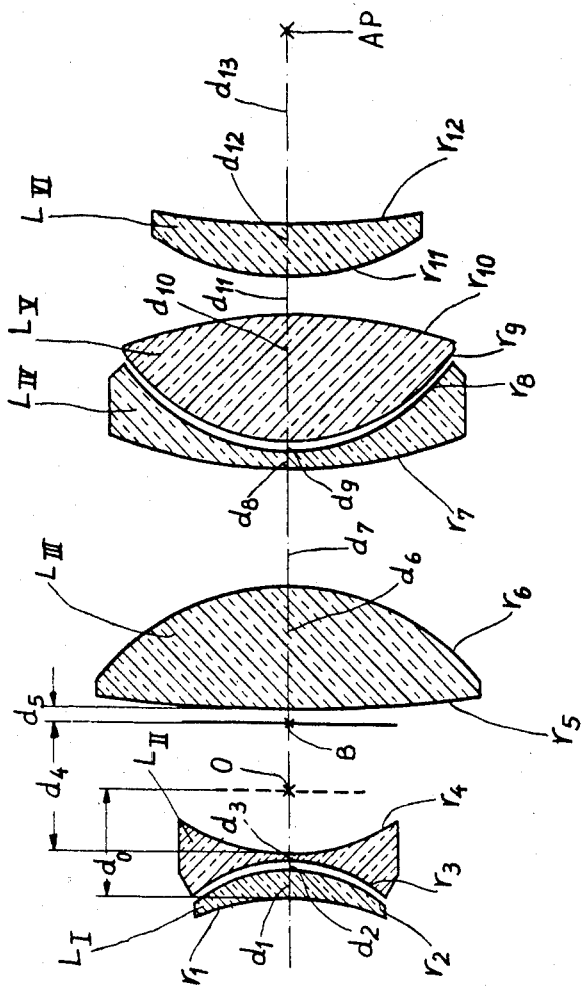

The present invention relates to an optical lens system, more particularly, to an improvement in a wide angle eyepiece having an image angle of at least 60°.

Wide-angle eyepieces having an image angle of at least 60° are already known but generally have the disadvantage that the eye of the user is positioned so close to the last face of the lens of the eyepiece that the field of vision is restricted when the user of the eyepiece wears eyeglasses. Thus, the known wide-angle eyepieces which can be used by persons wearing eyeglasses can obtain only angles of images which are smaller than 60°.

It is therefore the principal object of the present invention to provide a novel and improved wide-angle eyepieces having an image angle greater than 60°.

The eyepiece of the present invention is so constructed so that the distance between the eye of the user and the last face of the lens of the eyepiece measured along the optical axis is greater than the focal length of the eyepiece. As a result of this relationship such an eyepiece may also be used by persons wearing eyeglasses without the necessity for restricting the field of vision under these conditions.

The wide-angle eyepiece of the present invention essentially comprises four components which are axially aligned with respect to each other and which have spaces therebetween. The first component has a dispersing effect and is positioned in front of the real image projected by an objective used in conjunction with the eyepiece. Thus, the real image is formed only after the light rays have passed through the dispersing member. The second component is positioned at or in the vicinity of this real image and has a light-collecting effect. The third and fourth components also have a light-collecting effect.

The several components of the eyepiece of this invention are constructed in the following manner.

The first component consists of two lenses one of which, preferably the first lens, which is the closest to the objective, has a light-collecting effect. This first lens may also comprise a collecting meniscus lens the concave surface of which is directed toward the objective. The second lens of the first component is a double concave lens. The first and second lenses of this first component can be cemented together.

The second component consists of a single light-collecting lens the surface of which is directed toward the eye having a smaller radius of curvature than the surface directed toward the objective.

The third component consists of two lenses cemented together with the lens directed toward the objective having a dispersing effect. This lens is constructed as a meniscus lens with its concave surface being directed towards the eye. The second lens of the third component is a double convex lens.

The fourth component consists of a single light-collecting meniscus lens the concave surface of which is directed toward the eye.

The relationships between the several lenses of the eyepiece are illustrated in greater detail in the accompanying drawing. The individual lenses are indicated from $L_I$ through $L_{VI}$. The eye of the user is indicated at AP. The image plane of the real image projected by the objective used in conjunction with the eyepiece is indicated at O. The image plane into which the dispersing member of the eyepiece projects a real image O is indicated at B.

$d_0$ indicates the distance along the optical axis between the leading face of the first lens and the image plane O and $d_{13}$ is the distance along the optical axis between the eye of the user and the last face of the last lens of the eyepiece.

The numerical data for the eyepiece of the present invention are set forth in the following table wherein $r$ equals radius, $d$ equals thicknesses as multiples of the focal length $f$ of the eyepiece. The reference symbols $n_C$, $n_d$, and $n_F$ indicate the refractive indexes of the red hydrogen line C, the yellow helium line $d$, and the blue hydrogen line F, respectively.

| Lens | Radius of curvature | Curvature | Distance and spacing | $n_C$ | $n_d$ | $n_F$ |
|---|---|---|---|---|---|---|
| | | | $d_0 = -0.65094 \cdot f$ | | | |
| $L_I$ | $r_1 = -1.69692 \cdot f$ | $-0.58931 \colon f$ | $d_1 = 0.19830 \cdot f$ | 1.75366 | 1.76180 | 1.78190 |
| | $r_2 = -1.01082 \cdot f$ | $-0.98932 \colon f$ | $d_2 = 0$ | | | |
| $L_{II}$ | $r_3 = -1.01082 \cdot f$ | $-0.98932 \colon f$ | $d_3 = 0.06197 \cdot f$ | 1.48534 | 1.48749 | 1.49230 |
| | $r_4 = +1.20137 \cdot f$ | $+0.83236 \colon f$ | $d_4 = 0.83076 \cdot f$ | | | |
| B | image plane | | $d_5 = 0.02253 \cdot f$ | | | |
| $L_{III}$ | $r_5 = +16.48775 \cdot f$ | $+0.06065 \colon f$ | $d_6 = 0.76220 \cdot f$ | 1.56575 | 1.56883 | 1.57590 |
| | $r_6 = -1.49076 \cdot f$ | $-0.67078 \colon f$ | $d_7 = 0.70024 \cdot f$ | | | |
| $L_{IV}$ | $r_7 = +3.43493 \cdot f$ | $+0.29113 \colon f$ | $d_8 = 0.09295 \cdot f$ | 1.77607 | 1.78470 | 1.80613 |
| | $r_8 = +1.23644 \cdot f$ | $+0.80880 \colon f$ | $d_9 = 0$ | | | |
| $L_V$ | $r_9 = +1.23644 \cdot f$ | $+0.80880 \colon f$ | $d_{10} = 0.81178 \cdot f$ | 1.58518 | 1.58784 | 1.59380 |
| | $r_{10} = -3.10576 \cdot f$ | $-0.32198 \colon f$ | $d_{11} = 0.22928 \cdot f$ | | | |
| $L_{VI}$ | $r_{11} = +1.53432 \cdot f$ | $+0.65176 \colon f$ | $d_{12} = 0.32223 \cdot f$ | 1.58529 | 1.58875 | 1.59080 |
| | $r_{12} = +6.02097 \cdot f$ | $+0.16609 \colon f$ | $d_{13} = 1.14640 \cdot f$ | | | |

It will be understood that this invention is susceptible to further modification and, accordingly, it is desired to comprehend such modifications within this invention as may fall within the scope of the appended claim.

What is claimed is:

A wide-angle eyepiece comprising four components in axial alignment with each other, the first component being of dispersive effect and positioned in front of a real image projected by an objective used in cooperative relationship and in axial alignment with the components of said eyepiece, the second component having a light-collecting effect and positioned in the vicinity of the real image projected by an objective, the third and fourth components also having a light-collecting effect, the eyepiece having the following numerical data:

| Lens | Radius of curvature | Curvature | Distance and spacing | $n_C$ | $n_d$ | $n_F$ |
|---|---|---|---|---|---|---|
| | | | $d_0 = -0.65094 \cdot f$ | | | |
| $L_I$ | $r_1 = -1.69692 \cdot f$ | $-0.58931 \cdot f$ | $d_1 = 0.19830 \cdot f$ | 1.75366 | 1.76180 | 1.78190 |
| | $r_2 = -1.01082 \cdot f$ | $-0.98932 \cdot f$ | $d_2 = 0$ | | | |
| $L_{II}$ | $r_3 = -1.01082 \cdot f$ | $-0.98932 \cdot f$ | $d_3 = 0.06197 \cdot f$ | 1.48534 | 1.48749 | 1.49230 |
| | $r_4 = +1.20137 \cdot f$ | $+0.83236 \cdot f$ | $d_4 = 0.83076 \cdot f$ | | | |
| B | image plane | | $d_5 = 0.02253 \cdot f$ | | | |
| $L_{III}$ | $r_5 = +16.48775 \cdot f$ | $+0.06065 \cdot f$ | $d_6 = 0.76220 \cdot f$ | 1.56575 | 1.56883 | 1.57590 |
| | $r_6 = -1.49076 \cdot f$ | $-0.67078 \cdot f$ | $d_7 = 0.70024 \cdot f$ | | | |
| $L_{IV}$ | $r_7 = +3.43493 \cdot f$ | $+0.29113 \cdot f$ | $d_8 = 0.09295 \cdot f$ | 1.77607 | 1.78470 | 1.80613 |
| | $r_8 = +1.23644 \cdot f$ | $+0.80880 \cdot f$ | $d_9 = 0$ | | | |
| $L_V$ | $r_9 = +1.23644 \cdot f$ | $+0.80880 \cdot f$ | $d_{10} = 0.81178 \cdot f$ | 1.58518 | 1.58784 | 1.59380 |
| | $r_{10} = -3.10576 \cdot f$ | $-0.32198 \cdot f$ | $d_{11} = 0.22928 \cdot f$ | | | |
| $L_{VI}$ | $r_{11} = +1.53432 \cdot f$ | $+0.65176 \cdot f$ | $d_{12} = 0.32223 \cdot f$ | 1.58529 | 1.58875 | 1.59680 |
| | $r_{12} = +6.02097 \cdot f$ | $+0.16609 \cdot f$ | $d_{13} = 1.14640 \cdot f$ | | | | wherein the lenses are designated as $L_I \ldots L_{VI}$, the radii of curvature as $r_1 \ldots r_{12}$, the distances and spacings as $d_0 \ldots d_{13}$, with the distance $d_4$ representing the spacing between $L_{II}$ and the real image plane and the distance $d_5$ representing the spacing between the real image plane and the lens $L_{III}$ the refractive index for the red hydrogen line C is designated as $n_C$, the refractive index for the yellow helium line $d$ as $n_d$ and the refractive index for the blue hydrogen line F as $n_F$, and further where $f$ is the focal length of the eyepiece and $d_0$ is the distance measured along the optical axis of the eyepiece from the leading face of the first lens to the real image projected by an objective and $d_{13}$ is the distance measured along the optical axis between the last face of the last lens and the pupil of the eye.

References Cited by the Examiner

UNITED STATES PATENTS

| | | |
|---|---|---|
| 1,468,762 | 9/1923 | Taylor et al. |
| 2,423,676 | 7/1947 | Altman _____ 88—57 |
| 2,829,560 | 8/1958 | Tackaberry et al. _____ 88—57 |

FOREIGN PATENTS 137,281  8/1960  Russia.

JEWELL H. PEDERSEN, *Primary Examiner.*

FREDERICK M. STRADER, *Examiner.*

J. K. CORBIN, R. J. STERN, *Assistant Examiners.*